US 8,274,714 B2

(12) United States Patent
Bourgoin et al.

(10) Patent No.: US 8,274,714 B2
(45) Date of Patent: Sep. 25, 2012

(54) QUANTIFIABLE COLOR CALIBRATION

(75) Inventors: Michael Bourgoin, Lake Forest Park, WA (US); John F Kieltyka, Seattle, WA (US); Jeffery A Meissner, Sammamish, WA (US); Michael D Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 1449 days.

(21) Appl. No.: 11/292,417

(22) Filed: Nov. 30, 2005

(65) Prior Publication Data

US 2007/0121133 A1 May 31, 2007

(51) Int. Cl.
*H04N 1/60* (2006.01)
*H04N 17/00* (2006.01)
*H04N 1/46* (2006.01)
*H04N 1/56* (2006.01)
*H04N 1/58* (2006.01)

(52) U.S. Cl. ......... 358/504; 358/1.9; 358/500; 358/501; 358/505; 358/401; 358/406; 382/167

(58) Field of Classification Search ............ 358/1.9, 358/500, 501, 504, 505, 401, 406; 382/167
See application file for complete search history.

(56) References Cited

U.S. PATENT DOCUMENTS

| | | | |
|---|---|---|---|
| 4,905,169 A | 2/1990 | Buican et al. | |
| 5,107,332 A * | 4/1992 | Chan | 358/518 |
| 5,185,673 A | 2/1993 | Sobol | |
| 5,271,096 A * | 12/1993 | Cook | 345/604 |
| 5,280,344 A | 1/1994 | Witlin et al. | |
| 5,309,257 A | 5/1994 | Bonino et al. | |
| 5,313,291 A * | 5/1994 | Appel et al. | 358/501 |
| 5,377,000 A | 12/1994 | Berends | |
| 5,416,613 A * | 5/1995 | Rolleston et al. | 358/518 |
| 5,459,678 A | 10/1995 | Feasey | |
| 5,483,339 A | 1/1996 | Van Aken et al. | |
| 5,500,921 A | 3/1996 | Ruetz | |
| 5,537,516 A * | 7/1996 | Sherman et al. | 358/1.9 |
| 5,572,632 A | 11/1996 | Laumeyer et al. | |
| 5,583,666 A | 12/1996 | Ellson et al. | |
| 5,642,202 A * | 6/1997 | Williams et al. | 358/406 |
| 5,696,850 A * | 12/1997 | Parulski et al. | 382/261 |
| 5,701,175 A | 12/1997 | Kostizak et al. | |
| 5,704,026 A | 12/1997 | Wan | |
| 5,757,536 A | 5/1998 | Ricco et al. | |

(Continued)

FOREIGN PATENT DOCUMENTS

EP 0539943 5/1993

(Continued)

OTHER PUBLICATIONS

Printing system offers multiple formats, Apr. 8, 2003; retrieved from the Internet Nov. 22, 2005, http://news.thomasnet.com/fullstory/21137/447, pp. 1-6.

(Continued)

*Primary Examiner* — King Poon
*Assistant Examiner* — Beniyam Menberu
(74) *Attorney, Agent, or Firm* — Lee & Hayes, PLLC (57) ABSTRACT

Techniques relating to quantifiable color calibration are described. In one instance, a process quantifiably calibrates a first color peripheral device of a system to a known color standard. The process then leverages the first color peripheral device to calibrate other system color peripheral devices.

15 Claims, 8 Drawing Sheets

U.S. PATENT DOCUMENTS

| | | | |
|---|---|---|---|
| 5,809,164 A | 9/1998 | Hultgren, III | |
| 5,864,364 A | 1/1999 | Ohyama et al. | |
| 5,905,571 A | 5/1999 | Butler et al. | |
| 5,963,201 A | 10/1999 | McGreggor et al. | |
| 5,999,319 A | 12/1999 | Castracane | |
| 6,001,488 A | 12/1999 | Kataoka et al. | |
| 6,023,557 A | 2/2000 | Shaklee | |
| 6,027,201 A * | 2/2000 | Edge | 347/19 |
| 6,043,909 A | 3/2000 | Holub | |
| 6,157,735 A | 12/2000 | Holub | |
| 6,262,804 B1 | 7/2001 | Friend et al. | |
| 6,297,826 B1 | 10/2001 | Semba et al. | |
| 6,301,393 B1 | 10/2001 | Spaulding et al. | |
| 6,340,975 B2 | 1/2002 | Marsden et al. | |
| 6,373,595 B1 | 4/2002 | Semba et al. | |
| 6,400,843 B1 | 6/2002 | Shu et al. | |
| 6,411,304 B1 | 6/2002 | Semba et al. | |
| 6,416,153 B1 | 7/2002 | Pan et al. | |
| 6,459,425 B1 | 10/2002 | Holub et al. | |
| 6,525,721 B1 | 2/2003 | Thomas et al. | |
| 6,603,879 B2 | 8/2003 | Haikin et al. | |
| 6,611,356 B1 | 8/2003 | Shimizu et al. | |
| 6,618,499 B1 | 9/2003 | Kohler et al. | |
| 6,625,306 B1 | 9/2003 | Marshall et al. | |
| 6,646,762 B1 | 11/2003 | Balasubramanian et al. | |
| 6,681,041 B1 | 1/2004 | Stokes et al. | |
| 6,701,011 B1 * | 3/2004 | Nakajima | 382/167 |
| 6,704,442 B2 | 3/2004 | Haikin et al. | |
| 6,754,384 B1 | 6/2004 | Spaulding et al. | |
| 6,766,263 B1 | 7/2004 | Stokes | |
| 6,775,028 B1 | 8/2004 | Reel | |
| 6,775,633 B2 | 8/2004 | Edge | |
| 6,819,458 B1 | 11/2004 | Tanaka et al. | |
| 6,833,937 B1 | 12/2004 | Cholewo | |
| 6,836,345 B1 | 12/2004 | Setchell | |
| 6,859,551 B2 | 2/2005 | Ohga | |
| 6,888,553 B2 | 5/2005 | Kim et al. | |
| 6,934,053 B1 | 8/2005 | Mestha et al. | |
| 6,947,589 B2 | 9/2005 | Newman et al. | |
| 6,954,287 B1 | 10/2005 | Balasubramanian et al. | |
| 6,977,661 B1 | 12/2005 | Stokes et al. | |
| 6,992,683 B2 | 1/2006 | Shin et al. | |
| 7,035,460 B2 | 4/2006 | Gallagher et al. | |
| 7,126,686 B2 | 10/2006 | Tsujita | |
| 7,134,737 B2 | 11/2006 | Vilanova et al. | |
| 7,136,192 B2 | 11/2006 | Hussie | |
| 7,158,146 B2 | 1/2007 | Ohga | |
| 7,265,830 B2 | 9/2007 | Wang | |
| 7,391,475 B2 | 6/2008 | Pate et al. | |
| 7,414,631 B2 | 8/2008 | Tin | |
| 7,457,003 B1 | 11/2008 | Marcu et al. | |
| 7,463,386 B2 | 12/2008 | Misumi | |
| 2001/0015806 A1 | 8/2001 | Baker | |
| 2001/0038468 A1 | 11/2001 | Hiramatsu | |
| 2001/0045980 A1 * | 11/2001 | Leonard | 348/129 |
| 2002/0018121 A1 | 2/2002 | Fasciano | |
| 2002/0054384 A1 | 5/2002 | Motamed | |
| 2002/0105725 A1 | 8/2002 | Sweatt et al. | |
| 2002/0136445 A1 | 9/2002 | Haikin et al. | |
| 2002/0159065 A1 | 10/2002 | Berstis | |
| 2002/0169513 A1 | 11/2002 | Sherrill et al. | |
| 2003/0001860 A1 | 1/2003 | Yamazaki et al. | |
| 2003/0016289 A1 | 1/2003 | Motomura | |
| 2003/0053134 A1 | 3/2003 | Haro | |
| 2003/0094108 A1 * | 5/2003 | Shiki | 101/171 |
| 2003/0156283 A1 | 8/2003 | Jung et al. | |
| 2003/0202183 A1 | 10/2003 | Beimers et al. | |
| 2003/0234943 A1 | 12/2003 | Van Bael | |
| 2004/0061912 A1 | 4/2004 | Ohga | |
| 2004/0096104 A1 | 5/2004 | Terekhov | |
| 2004/0190022 A1 | 9/2004 | Kiyohara | |
| 2004/0207862 A1 | 10/2004 | Such et al. | |
| 2004/0218072 A1 | 11/2004 | Zhang | |
| 2004/0245350 A1 | 12/2004 | Zeng | |
| 2005/0024379 A1 | 2/2005 | Marks | |
| 2005/0031224 A1 | 2/2005 | Prilutsky et al. | |
| 2005/0036705 A1 * | 2/2005 | Viassolo et al. | 382/275 |
| 2005/0047654 A1 | 3/2005 | Newman et al. | |
| 2005/0057670 A1 | 3/2005 | Tull et al. | |
| 2005/0065440 A1 | 3/2005 | Levenson | |
| 2005/0073545 A1 | 4/2005 | Vilanova | |
| 2005/0073685 A1 | 4/2005 | Arai | |
| 2005/0078122 A1 | 4/2005 | Ohga | |
| 2005/0078326 A1 | 4/2005 | Stokes et al. | |
| 2005/0094871 A1 | 5/2005 | Berns et al. | |
| 2005/0146735 A1 | 7/2005 | Ternasky et al. | |
| 2005/0281459 A1 * | 12/2005 | Bala et al. | 382/162 |
| 2006/0197966 A1 * | 9/2006 | Viturro et al. | 358/1.9 |
| 2007/0002344 A1 * | 1/2007 | Klassen | 358/1.9 |
| 2007/0177141 A1 | 8/2007 | Ohishi et al. | |

FOREIGN PATENT DOCUMENTS

| | | |
|---|---|---|
| EP | 0611231 A1 | 8/1994 |
| EP | 1489831 | 12/2004 |
| EP | 1492330 A1 | 12/2004 |
| GB | 2381983 | 5/2003 |
| JP | 2000050086 | 2/2000 |
| JP | 2003085546 A | 3/2003 |
| JP | 2005124164 A | 5/2005 |
| JP | 2005210526 A | 8/2005 |
| JP | 2005277769 | 10/2005 |
| KR | 20000019374 A | 6/2000 |
| KR | 20040036116 A | 4/2004 |
| KR | 20040036790 A | 5/2004 |
| WO | WO9531794 | 11/1995 |
| WO | WO0042595 | 7/2000 |
| WO | WO0117233 | 3/2001 |
| WO | WO2004012442 | 2/2004 |
| WO | WO2004012461 | 2/2004 |
| WO | WO2007027745 | 3/2007 |

OTHER PUBLICATIONS

Drupa Product Review PT.1, Jun. 1, 2004; retrieved from the Internet Nov. 22, 2005: http://americanprinter.com/mag/printing_drupa_product_review/ pp. 1-8.

Ostromoukhov, V., et al., "Two Approaches in Scanner-Printer Calibration: Colorimetric Space-Based vs. "Closed-Loop"," IS&T/SPIE 1994 Int'l Symposium on Electronic Imaging: Science & Technology, Feb. 6-Feb. 10, 1994, 10 pages.

PCT Search Report for PCT Application No. PCT/US2006/033822, mailed Jan. 9, 2007 (2 pages).

Corrigan, et al., "Silicon Light Machines—Grating Light Valve Technology Brief"; Jun. 2001 ver. C; 8 pages.

Daniels, "Eye-One Photo GretagMacbeth's Color Management for Professional Photographers," retrieved from the Internet on Nov. 22, 2005, http://www.shutterbug.com/test_reports/0304sb_eye/, Shutterbug, Mar. 2004, 5 pages.

Diffractive MEMS; 4 pages.

EETimes.com—Diffractive optical MEMs using grating light valve techinque; http:/www.eetimes.com printed Jul. 18, 2005; 5 pages.

Godil, "Diffractive MEMS technology offers a new platform for optical networks"; Laser Focus World May, 2002. 3 pages.

Hardeberg, "Color Management: Principles and solutions".

Starkweather; "Increasing Screen Size Valuing Productivity" Jun. 18, 2002; 31 pages.

King, Why Color Management? Adobe Systems Incorporated.

Knight, "Decreasing Download Time through Effective Color Management", Microsoft Interactive Developer (1996).

Lieberman, "Microsoft sets sights on future displays"; www.eet.com; printed Jul. 18, 2005; 5 pages.

Media for; Laser Focus World; http://laserfocusworld.printthis.clickability.com; printed Jul. 18, 2005.

Riesenberg, et al., "Optical MEMS for High-End Micro-Spectrometers"; SPIE vol. 4928; 9 pages.

Rosen, et al., "Color Management within a Spectral Image Visualization Tool," retrieved from the Internet Nov. 22, 2005, http://www.cis.rit.edu/people/faculty/fairchild/PDFs/PRO10.pdf, 7 pages.

"Windows Color Management: Background and Resources." (2001). www.xrite.com/documents/literature/en/L11-044_DTP41_en.pdf; Unsurpassed Accuracy; DTP41 SeriesII AutoScan Spectrophotometer.

XYZ Observer Model 5B, retrieved from the Internet Nov. 22, 2005, http://www.spectralmasters.com/XYZ%20OBSERVER.html, 2 pages.

Yokoyama, et al., "A New Color Management System Based on Human Perception and its Application to Recording and Reproduction of Art Paintings", retrieved from the Internet Nov. 22, 2005, www.mi.tj.chiba-u.jp/~tsumura/Tsumura/papers/CIC5_yokoyama.pdf, The Fifth Color Imaging Conference: Color Science, Systems, and Applications, pp. 169-172.

Lou, et al., "Two Unsolved Issues in Colour Management—Colour Appearance and Gamut Mapping", 5th International Conference on High Technology, World Techno Fair in Chiba, Preceedings of Imaging Science and Technology: Evolution and Promise, Sep. 11, 1996, XP00106252, 136-147.

Wei-Ling, et al., "ColorSync: Synchronizing the Color Behavior of Your Devices", Digest of Papers of COMPCON (Computer Society Conference) 1996 Technologies for the Information Superhighway, Santa Clara, IEEE Comp. Soc. Press, vol. Conf 41, Feb. 25, 1996, pp. 440-444.

The Eyptiian Office Action mailed Feb. 28, 2011 for Egyptian Patent Application No. PCT 352/2008, a counterpart foreign application of US Patent No. 7,822,270.

Translated the Israeli Office Action mailed Aug. 11, 2011 for Israeli patent application No. 189421, a counterpart foreign application of US patent No. 7,822,270, 2 pages.

Translated the Japanese Office Action mailed Jul. 22, 2011 for Japanese patent application No. 2008-529223 a counterpart foreign application of US patent No. 7,822,270, 10 pages.

Final Office Action for U.S. Appl. 12/884,009, mailed on Sep. 23, 2011, Hubert Van Hoff, "Multimedia Color Management System", 9 pages.

Specification ICC.1:2001—04, File Format for Color Profiles, United States, International Color Consortium, 2001, Revision of ICC.1:1998-09, pp. 13-14, found on the internet at http://www.color.org/ICC_Minor_Revision_for_Web.pdf.

The European Office Action mailed Dec. 7, 2011 for European patent application No. 06790095.1, a counterpart foreign application of US patent No. 7,822,270, 4 pages.

The New Zealand Office Action mailed Feb. 7, 2012 for New Zealand patent application No. 588477, a counterpart foreign application of US patent No. 7,822,270, 2 pages.

\* cited by examiner

QUANTIFIABLE COLOR CALIBRATION

BACKGROUND

Users often associate multiple devices to achieve a desired image functionality. For instance, a user may utilize a digital camera to capture an image and then may desire to print or view the image. Accordingly, the user may, for instance, couple the digital camera to a printer and a monitor.

When the devices are coupled, the user wants an image captured by digital camera to appear the same on each of the devices. Present technologies allow some individual devices to be color calibrated. However, with present technologies, even if each individual device is color calibrated, images may appear differently on different devices. Further, if the image data is sent beyond these devices, such as by email, the image may appear still differently on the recipient's devices.

SUMMARY

Techniques relating to quantifiable color calibration are described. In one instance, an exemplary process quantifiably calibrates a first color peripheral device of a system to a known color standard. The process then leverages the first color peripheral device to calibrate other system color peripheral devices.

In another instance, an exemplary process processes image data. The process then associates a quantifiable color state based upon a separately calibrated computer system with the image data. Among other uses the associated color state can, for instance, be utilized to recreate a color state in which the image data originated.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION

Overview

Techniques are described for color calibrating color peripheral devices of a system. Many color standards include tolerances such that if two color peripheral devices are calibrated to the standard in isolation they may reproduce colors differently. At least some of the exemplary techniques allow a user to calibrate a first system color peripheral device to a known color standard and then leverage the calibrated color peripheral device in color calibrating other system color peripheral devices. In some instances the first system color peripheral device may be calibrated to preferences of the user within the color standard. The first calibrated color peripheral device is leveraged to calibrate the remaining color peripheral devices to a consistent quantifiable color state. Such color calibration techniques can facilitate a consistent system wide color state. Maintaining a consistent color state allows image color to remain consistent from one system color peripheral device to the next system color peripheral device. For instance, an image captured by a camera appears essentially the same on the camera as it does displayed on a monitor or printed on a printer of the system.

Some implementations contribute to consistent image reproduction outside of a given system by saving information relating to the color state which existed when a particular image was processed. For instance, the color state information may be saved in memory so that when the image is subsequently encountered the color state can be restored. In another example, the color state information is stored with the image data. For instance, the color state information may be attached to the image data as metadata so that other systems and/or devices may be similarly configured utilizing the color state information to replicate the color state conditions and hence reproduce colors which the image's producer experienced.

Exemplary Systems

Figure 1:
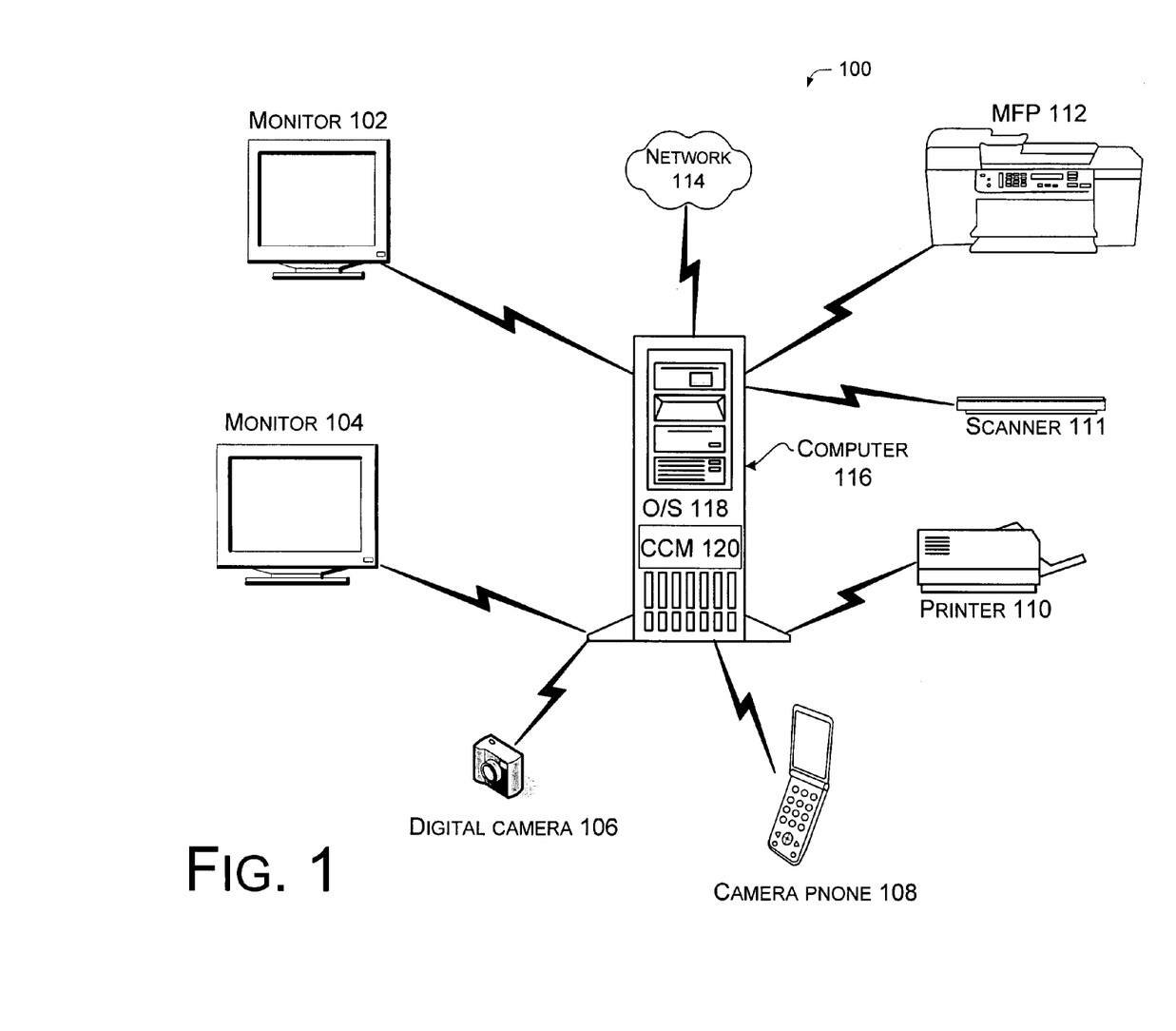
FIGS. 1-5 illustrate exemplary systems which can employ quantifiable color calibration in accordance with one implementation.

FIG. 1 shows an exemplary system 100 where a consistent system-wide color state can be established in accordance with one implementation. System 100 includes various color peripheral devices. In this particular scenario the color peripheral devices include first and second monitors 102, 104, a digital camera 106, a camera phone 108, a printer 110, a scanner 111, and an all-in-one or multi-function peripheral (MFP) 112. The illustrated color peripheral devices are but examples, and various other color peripheral devices can be utilized. For purposes of explanation color peripheral devices can be categorized as a capture device and/or a destination device. For instance, MFP 112 can be thought of as both a capture device, due to its scanning capabilities, and a destination device due to its printing capabilities.

System 100 also is coupled to a network 114 for communicating image data into and out of system 100. In this particular configuration, a computer 116, having an operating system 118 operating thereon, facilitates image data transfer and processing between the various color peripheral devices and the network. Operating system 118 identifies the various color peripheral devices making up the system at any given time. Further, the operating system identifies a color profile of each system color peripheral device. A color profile contains the colors which a respective color peripheral device is capable of reproducing. In this instance, the operating system includes a color calibration module (CCM) 120 which manages system wide color calibration.

The CCM 120 facilitates color calibration of a first color peripheral device of system 100. Color calibration means that the peripheral device is calibrated sufficiently to be within tolerances of a known color standard. In some implementations color calibration goes beyond calibration within the tolerances of a known color standard and may further include adjustments within those tolerances until the color peripheral device appears 'correct' to a user's color preferences. For instance a given color calibration standard may hypothetically allow tolerances of +/−5 units for a red component. To a particular hypothetical user, the color calibration may appear correct at +3 units for the red component. In such instances, color calibration allows subjective user choices within the tolerances of a known standard. The act of calibrating establishes a color state of the first color peripheral device. For instance, the color state of a calibrated hypothetical first color peripheral device may be conveyed as x value red, y value green and z value blue in but one example.

The CCM 120 can leverage the calibrated first color peripheral device to achieve system wide color calibration. For example, upon calibrating the first color peripheral device, the CCM may utilize the first calibrated color peripheral device as a benchmark or foundation to calibrate other system color peripheral devices. Examples of how the CCM leverages the first calibrated color peripheral device are described below at least in relation to FIG. 2. As mentioned above, in some instances the CCM can leverage the calibrated first color peripheral device to achieve system wide color calibration consistent with user-selected color preferences established with the first calibrated color peripheral device. Examples of such techniques are described below in relation to FIGS. 2-4.

Calibrating a First System Color Peripheral Device

Various techniques are available for quantifiably calibrating various types of color peripheral devices. For instance, a scanning device may be calibrated with a special target image described in International Electrotechnical Commission (IEC) 961666-8. This particular target image contains 88 spectrally unique colors that when scanned into the scanner or other capture device can be analyzed with a set of computations described in IEC 961666-8 to quantifiably calibrate the capture device. Techniques also exist for quantifiably calibrating printers and monitors. For instance, many printers contain a self-calibration program which often includes printing a target image and querying the user about the target image. The printer, through its driver, makes calibration adjustments responsive to the user input. In another instance, one such technique for quantifiably calibrating monitors is available in the Windows® Media Center Edition Brand Operating System available from Microsoft® Corporation. This particular technique calibrates a monitor controlled by the operating system to a standard red, green, blue (sRGB) color space. This particular technique employs a target video which is played on the monitor. The user is asked a series of questions in relation to viewing the target video. In this example, the user can make changes to the monitor via keys on a keyboard rather than physically engaging input mechanisms on the monitor. While this quantifiable color calibration technique tends to be performant and relatively easy to use, many other techniques may be utilized for calibrating the monitor and/or other color peripheral devices. The existing techniques available for calibrating color peripheral devices calibrate an individual device in isolation and without awareness of other system color peripheral devices. The concepts described above and below leverage a quantifiably calibrated device to achieve system-wide color calibration.

Leveraging the System's First Calibrated Color Peripheral Device

Figure 2:
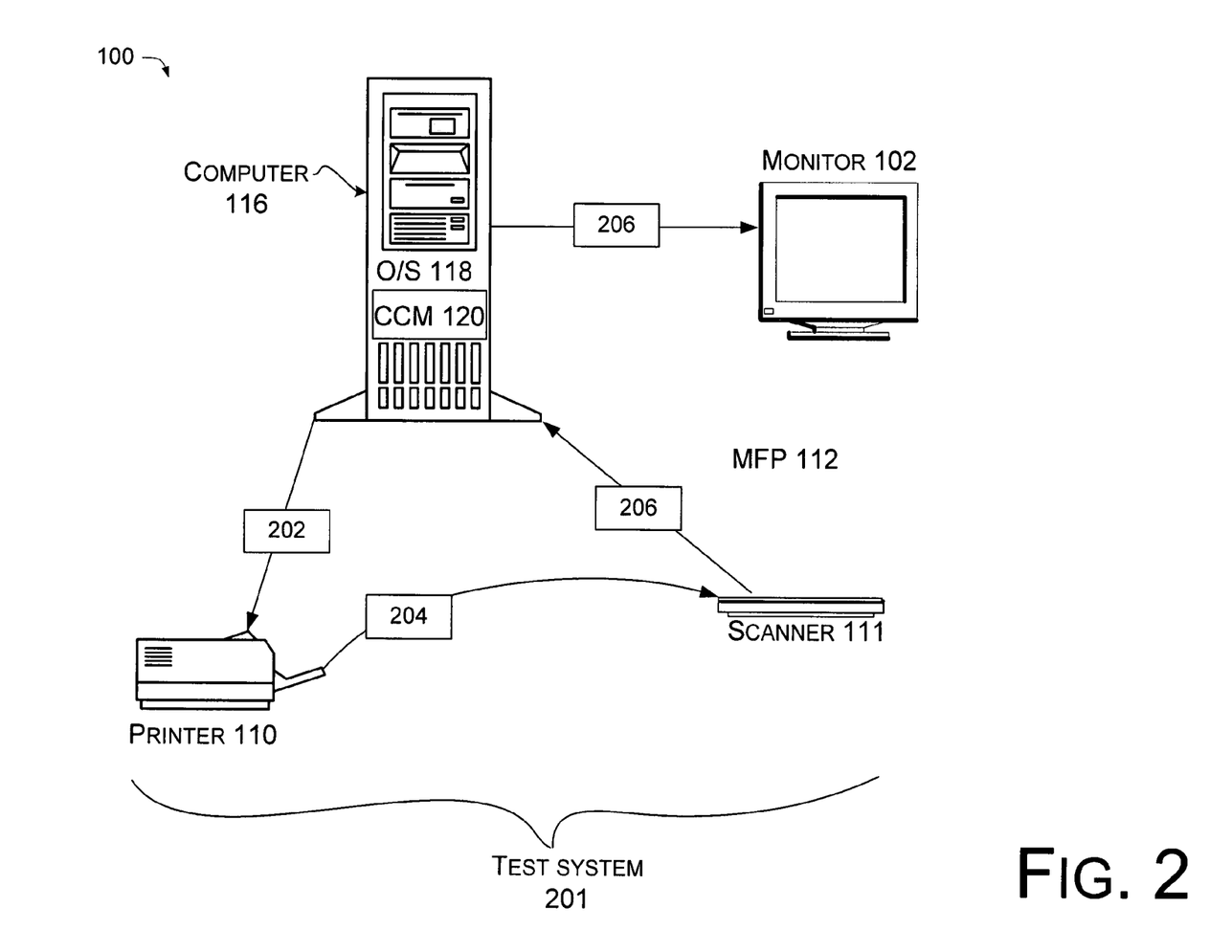

FIG. 2 illustrates but one example of how CCM 120 leverages a first calibrated color peripheral device. For purposes of explanation, assume that monitor 102 is the first calibrated peripheral device and is calibrated to user-selected color preferences. The CCM utilizes the calibrated monitor 102 as a foundation for calibrating other system color peripheral devices. For instance, in one configuration, the CCM 120 selects a capture device and a destination device for calibrating in conjunction with the calibrated monitor. In the example illustrated in FIG. 2, printer 110 is the selected destination device and scanner 111 is the selected capture device. The CCM may test the selected capture and destination devices as a test system 201 and then test them separately to determine calibration error introduced by each color peripheral device.

In each testing instance the first calibrated color peripheral device can act as a benchmark to which the test system and the test devices can be compared. Since the test system 201 has only two color peripheral devices which can introduce calibration error, by determining test system calibration error and calibration error resulting from one of the color peripheral devices under test then the calibration error of the remaining color peripheral device under test can be calculated.

Testing a color peripheral device serves to determine calibration error of that particular device. The color peripheral device is considered calibrated when it is adjusted to correct the calibration error. Such adjustments may be accomplished on the color peripheral device itself, such as through color adjustment mechanisms provided on the color peripheral device, and/or by software calibration adjustment. Software calibration adjustment entails manipulating the data which is supplied to the color peripheral device to compensate for the device's calibration error. For instance, a particular color peripheral device, such as digital camera, may not include any calibration means. Assume for purposes of a simplified example that the calibration testing indicates that the digital camera is mis-calibrated so that a hypothetical blue component of an image which should appear as a value of 10 is represented as a value of 11. Software calibration adjustment allows image data received by the CCM from the camera to be compensated such that a blue value of 10 is substituted in image data specifying a blue value of 11. Thus by reducing blue values before sending the image data to other system components an effective color calibration is maintained. A similar approach can be applied to destination devices. The skilled artisan should recognize other techniques for applying software calibration adjustment to calibrate a color peripheral device of a system.

In another example of calibration error correction, a color peripheral device may include a calibration means but the CCM's calibration testing may show that the calibration error is greater than can be compensated by the calibration means. So for instance, assume that a hypothetical color peripheral device has a means to compensate a color component by 5%, but the testing shows that the device is mis-calibrated by 8%. The CCM can cause the color peripheral device to be adjusted by the 5% and then utilize software calibration adjustment to compensate for the remaining 3%. Again, the skilled artisan should recognize other variations. As each color peripheral device is calibrated a color state is established for that device. The color state may simply reflect color settings of the device, or in instances where software calibration adjustment is included to achieve the device's color calibration, that information can also be included as part of the color state. For instance, consistent with the above example the color state of a hypothetical color peripheral device may include an internal setting of red at −5% and an additional software compensation of color data sent to the device of −3% to achieve an overall color state for red of −8%. For ease of explanation in the above example, quantifiable calibration values are expressed on a percentage basis; the skilled artisan should recognize other suitable implementations for quantifiably expressing calibration values.

In the example of FIG. 2, in order to test the test system 201 of printer 110 and scanner 111 the CCM utilizes a target image. Often such target images have flesh tones, hair, highlights, shadows etc, but the skilled artisan should recognize many variants. Since monitor 102 is calibrated, if the target image was sent to the monitor the target image should appear 'correct' to a user without adjusting the monitor. The CCM 120 sends target image 202 to printer 110 with an instruction to print the target image. The CCM then instructs the user, such as via instructions displayed on monitor 102, to place the printer's target output 204 into the scanner 111. The scanner's target output 206 is returned to computer 116. The scanner's target output represents test system error caused by both the printer and the scanner. The CCM sends the scanner's target output 206 to monitor 102. The monitor displays the scanner's target output 206 for a user. The CCM can ask a series of questions of the user to determine if the test system 201 of the printer 110 and the scanner 111 produced any calibration error. If no test system calibration error was produced then the test system 201 is calibrated. If system error is detected, the CCM can manipulate the scanner target output responsive to the user responses until the scanner's target output appears correct to the user. For example, if the user responds that the scanner's target image appears too green on monitor 102, then the CCM can, through software manipulation, delete green components of the scanner's target image until the user responds that it appears correct. For instance, in a simplified hypothetical example the CCM 120 may delete one percent of the green component stepwise until at say 10% deletion the user says that the scanner's target image appears normal. As such, the test system introduced calibration error for the green component is 10%. Other colors can be handled in a similar manner to determine test system error.

In one scenario, in order to determine which color peripheral device is introducing the system error, the CCM 120 isolates one of the test color peripheral devices. For instance, the CCM can send the original target image 202 to the printer 110 for printing. If the printed target image appears correct then the scanner 111 is introducing all of the test system calibration error. To aid the user in evaluating the printer output, the CCM could also send the original target image 202 for display on the monitor 102 for comparison sake. If the printed image appears the same as the image on the monitor 102 then the printer 110 is not introducing calibration error. If the printed output of the original target image does not match the monitor's display, then the CCM 120 can go through a question and adjustment process with the user similar to that described above in relation to the test system evaluation. Responsive to the user response, the CCM 120 can manipulate the original target image data sent to the printer 110 and/or manipulate the printer's settings until such a time as the printer's corresponding output is perceived as correct by the user.

The CCM 120, by knowing the test system calibration error and the calibration error of one test system color peripheral device, can calculate the calibration error for the remaining system color peripheral device as the difference between the test system calibration error and the calibration error associated with the other color peripheral device under test. In the simplified hypothetical example described above, if the test system calibration error for green is 10% and the printer 110 did not introduce any error then the calibration error for the scanner 111 is 10%. Of course in other instances, both color peripheral devices under test may introduce some of the test system calibration error. Correspondingly, in some scenarios, the color peripheral device errors may have opposite values and effectively cancel one another out, either partially or wholly. So for example, the system error for the green component may be only two percent (+2%), but the printer calibration error turns out to be a positive eight (+8%) so the scanner has a calibration error of negative six (−6%).

Iterative Color Calibration

Figure 3:
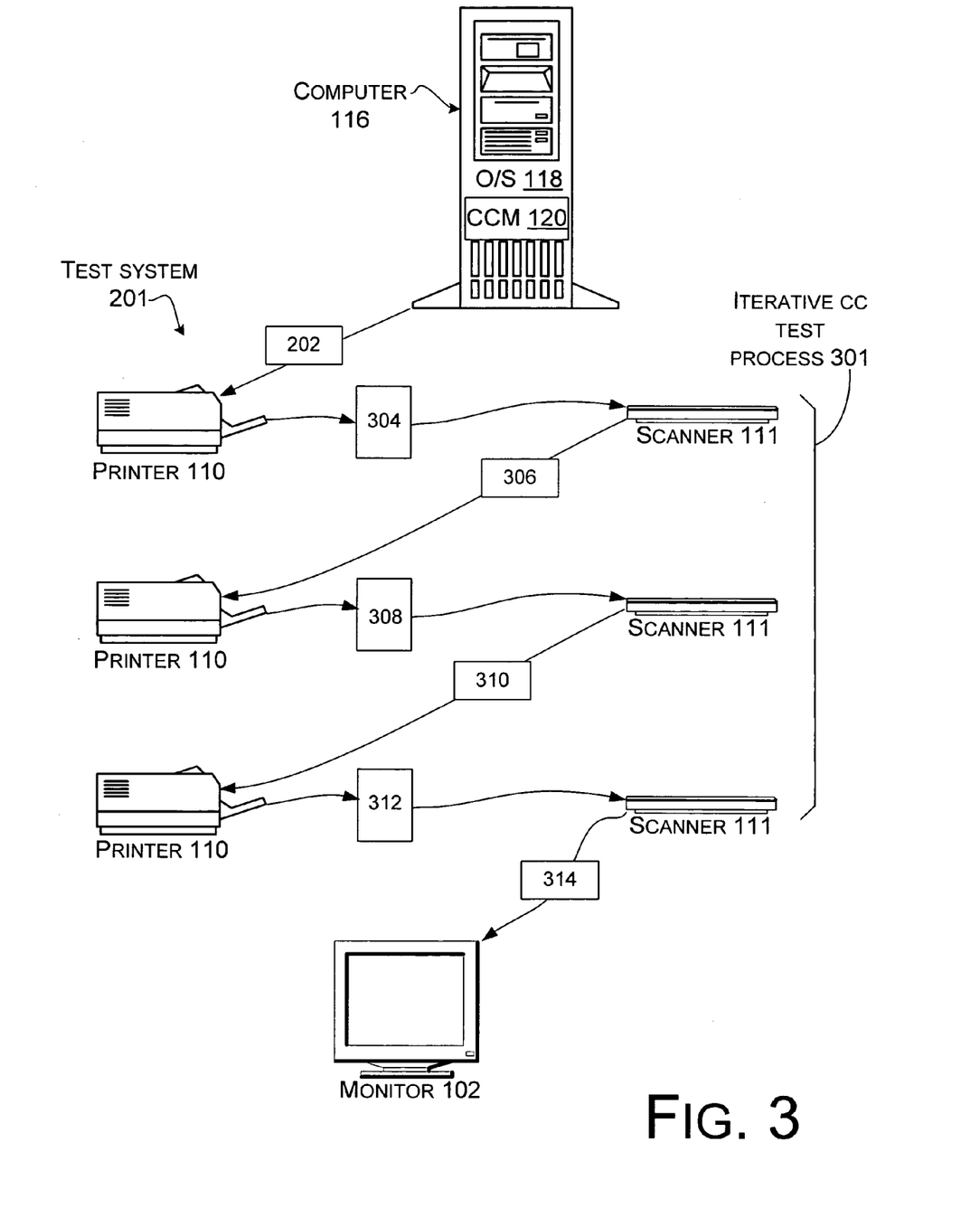

FIG. 3 illustrates another scenario for detecting calibration error of a test system and of the test system's respective color peripheral devices in relation to a calibrated color peripheral device 102. In this implementation an iterative color calibration test process 301 is employed in evaluating a test system for calibration error. The iterative color calibration test process 301 can serve to accentuate calibration errors within the test system 201 and/or the test system color peripheral devices 110, 111. The iterative color calibration test process involves utilizing the output of a first system color peripheral device under test as input for a second system color peripheral device under test and then utilizing the output of the second color peripheral device as input for the first color peripheral device. This iterative color calibration test process is repeated two or more times while maintaining the test system at a steady state. A test system steady state means that no calibration adjustments are made to the test system or the test system color peripheral devices under test during the iterative color calibration test process. This concept will be explained in more detail below by way of example.

FIG. 3 involves a test system comprised of printer 110 and scanner 111. Though not specifically illustrated to avoid clutter on FIG. 3, the printer 110, scanner 111 and monitor 102 are each electronically coupled to computer 116. In this instance, for testing purposes CCM 120 sends an electronic version of original target image 202 to printer 110. The printer generates a printer's first target output 304 which is then positioned in scanner 111. The scanner scans the printer's first target output 304 and generates scanner's first target output 306 which is sent back to printer 110 (via computer 116). The printer responsively generates a printer's second target output 308 which is subsequently positioned in scanner 111. Responsively, the scanner generates a scanner's second target output 310 which is delivered to printer 110. Utilizing the scanner's second target output 310 the printer 110 generates a printer's third target output 312 which is then delivered to scanner 111. The scanner generates a scanner's third target output 314 from the printer's third target output 312. The scanner's third target output 314 is delivered to previously calibrated monitor 102. The monitor can generate an image from the scanner's third target output 314 which can be evaluated by a user.

During the iterative color calibration test process 301 described in relation to FIG. 3, the test system is maintained in a steady state. Stated another way, during the iterative color calibration test process no color calibration adjustments are made to the test system or the individual test system color peripheral devices 110, 111 between the time that the original target image 202 is delivered to printer 110 and the scanner's third target output 314 is delivered to monitor 102. Maintaining a test system steady state during the iterative process serves to accentuate test system color calibration error. In this example, a user viewing scanner's third target output 314 may more readily identify calibration error than if the user instead viewed the scanner's first target output 306. The CCM 120 can employ a similar color calibration question and adjustment process with the user as described above in relation to FIG. 2.

Once the test system's color calibration error is determined the CCM 120 can employ the same type of corrective adjustment described above with realization of the iterative color calibration test process. For instance, if the iterative process consisted of three cycles and through the user questions the CCM determines that the test system's green component is off by 9% then the CCM can make an adjustment corresponding to the error multiplied by the inverse of the number of iterative cycles. So in this example, the green color correction is 9% * ⅓ which equals 3%. The skilled artisan should recognize other variations. The number of iterative cycles utilized in the iterative color calibration test process can be based upon balancing potentially countervailing factors. For instance, an increased number of cycles may be more performant, but the associated printing costs may be less desirable to the user. Once a test system and its particular color peripheral devices are calibrated, other system devices can be substituted into the test system until all of color peripheral device are calibrated.

Figure 4:
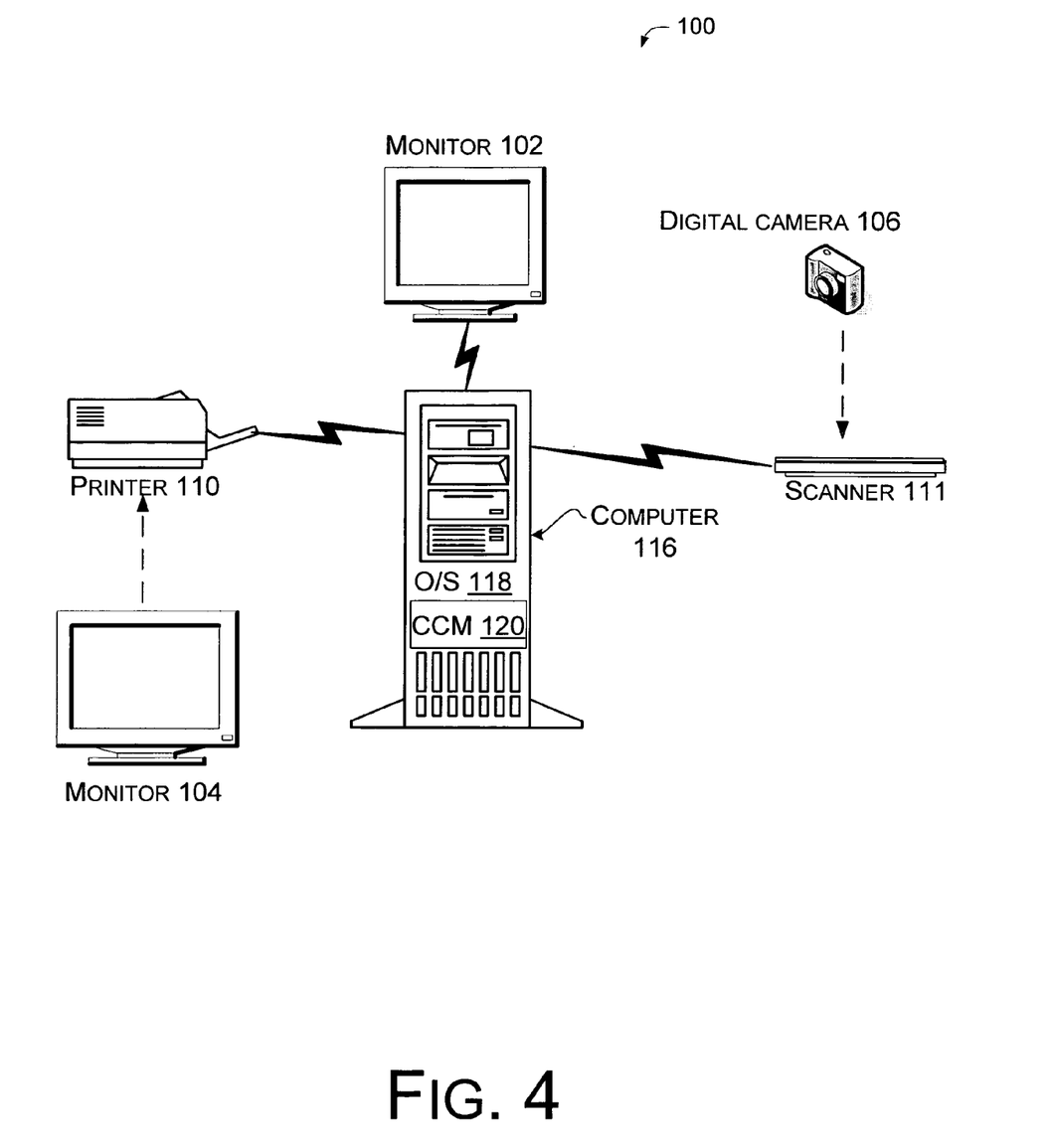

FIG. 4 illustrates a portion of system 100 illustrated in FIG. 1 and illustrates how a system's color peripheral device's can be substituted into the test system. For instance, FIG. 2 illustrated one example of how printer 110 and scanner 111 can be calibrated utilizing the previously calibrated monitor 102. Once specific color peripheral devices are calibrated, other devices can be substituted into the test system. For instance, in this implementation the test system comprises a capture device in the form of scanner 111 and a destination device in the form of printer 110.

Once the test system and the printer and scanner are calibrated other color peripheral devices can be substituted into the test system. For example, digital camera 106 can be substituted for scanner 111. In such a scenario, the digital camera is utilized to take a picture of the printer's target image output in an analogous way to how the printer's target image was handled by the scanner. Similarly, monitor 104 can be substituted for printer 110 as the destination device. In such a scenario, the digital camera 106 can take a picture of the target image output displayed on monitor 104. In some scenarios, both the destination device and capture device of the test system can be substituted at the same time. In other scenarios it may be more performant to substitute for either the destination or the capture device, determine the calibration error for the newly substituted device and then substitute the other of the destination of capture devices. For instance, the digital camera 106 could be substituted into the test system in place of the scanner 111 and then calibrated. Subsequently, monitor 104 could be substituted for printer 110. Similarly, color peripheral devices which are added to the overall system 100 can be color calibrated utilizing the above described techniques.

Once each color peripheral device of the color system is calibrated utilizing the techniques described above, a color image should appear essentially identically on each system color peripheral device in at least some implementations. Stated another way, the above techniques establish a color state associated with an image. For instance, the techniques can provide both a system color state and a color state of individual color peripheral devices with which a user engaged an image. Knowing the color state associated with an individual image provides an opportunity to recreate the image to the user's satisfaction as will be described in more detail below.

Associating a Color State with an Image

At least some of the techniques described above establish a system color state. A user may experience enhanced satisfaction when capturing or otherwise importing images into such a system. The images can then be processed and/or reproduced on any of the system's calibrated color peripheral devices. As mentioned above, in some scenarios the system is calibrated consistent with the user color preferences established in the process of calibrating the first system color peripheral device. In at least some instances, the system is calibrated as a separate and distinct process such as is described above in relation to FIGS. 1-4 before the image is generated. In such instances, the image is generated and/or processed in the user's color preferences system wide. However, if the image is exported to a different system or to a freestanding device, the resultant image reproductions may appear much different to the user. Such is the case even if the different system or freestanding device is calibrated to a known color standard. The techniques described below function to associate a quantifiable color state with the image's data. The quantifiable color state can represent the system's color calibration. Such a technique provides information which increases a likelihood of the image being reproduced outside of the original system consistent with the user's expectations. In some instances, the color state information is attached to the image data so that the color state information is subsequently available during processing of the image data. One such example is described below in relation to FIG. 5.

Figure 5:
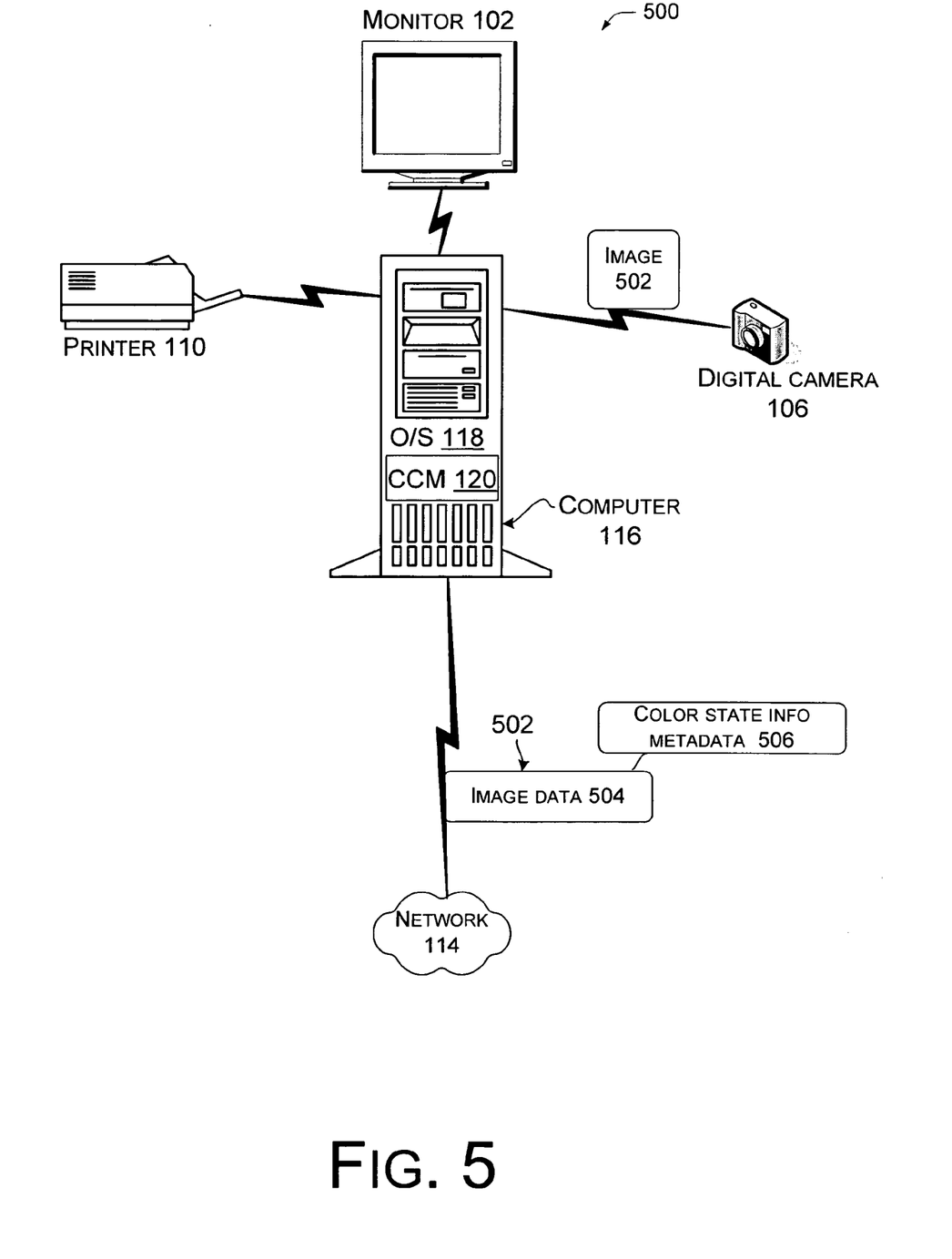

FIG. 5 illustrates a system 500 where color state information can be associated with image data. System 500 includes monitor 102, digital camera 106, printer 110 and computer 116. Assume for purposes of explanation that system 500 and its color peripheral devices are calibrated consistent with the techniques described above in relation to FIGS. 1-4. An image 502, such as from a picture taken by a user on digital camera 106, can enter system 500. The image 502 can be displayed on monitor 102 and/or printed on printer 110, and in either instance should appear consistent with the user's color preferences. Further, the computer's CCM 120 can associate color state information with the image. For instance, the color state information may include a color state, such as color calibration settings of individual system devices at the time the image was processed in the system. In another example, the color state information may include a listing of the system configuration at the time that the image was handled by the system. For instance such a listing may identify each device of the system as well as a color state for each device.

In some implementations the color state information may be stored in computer 116 such as in a look-up table where an identification number associated with the image cross-references to the color state information for that image. In other implementations, the color state information may be coupled to the image. For instance, in one scenario illustrated in FIG. 5, the color state information is attached to image 502 so that the image includes image data 504 and color state information metadata 506. Such a configuration is particularly useful when the image is sent outside the system such as via network 114 or by being stored on a storage media which can then be physically removed from the system and installed in another system. Coupling the color state information to the image can provide information so that whatever system and/or device which receives the image is more likely to represent the image consistent with the user's expectations. For instance, assume for purposes of explanation that the user is on a business trip and takes image 502 of some clothes that he/she is thinking of purchasing. The user then reviews the clothes on monitor 102 and decides that image 502 captures the color of the clothes. The user then decides to email the image 502 to his/her spouse to ensure that the clothes match other garments the user already owns. The CCM 120 couples the color state information metadata 506 to image data 504 of image 502 that is sent to the spouse via email over network 114. The color state information enables the spouse's system to make color adjustments so that the image more closely approximates the color state of system 500. For instance, in one scenario the spouse's system may automatically recalibrate its color peripheral devices to the color state coupled to the image. In another scenario the spouse's system could display some type of graphical user interface which states for example, "The image you are attempting to open was created in a known color state. Would you like to calibrate this system to the system color state associated with this image?"

Commercial color processing could also utilize the color state information coupled to the image. For instance, if the image was sent to a business for color processing the color processing equipment could read the color state information coupled to the image and set the color processing equipment to that particular color state. The user is more likely to be satisfied with the results of the commercial color processing when the color processing system is configured to the same color state as the user's system. Otherwise, the color processing may produce, for instance, a print which is, for example, greener or lighter etc., than the user expected. The skilled artisan should recognize many other uses for the coupled color state information metadata.

Figure 6:
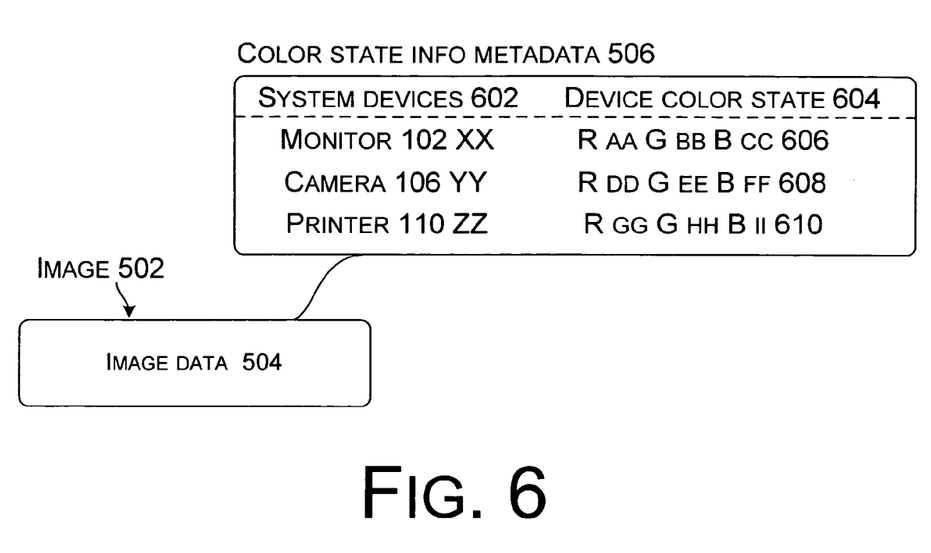
FIG. 6 illustrates an exemplary technique for associating color state with an image in accordance with one implementation.

FIG. 6 illustrates but one example of a configuration for image 502 which contains both image data 504 and associated color state information metadata 506 as described in FIG. 5. In this instance, image 502 includes image data 504 which can be in any existing or yet to be developed format. Image data 504 may be in a compressed or uncompressed form. In this instance, color state information metadata 506 is coupled to image data 504.

In this illustrated configuration the color state information metadata 506 contains a listing of the system devices 602 at the time that image 502 was generated and/or processed, and a device color state 604 associated with the individual system color peripheral devices at a corresponding time. In this configuration, which provides but one example, monitor 102 is listed with information XX describing a manufacturer, model number, and/or serial number of the monitor. The device color state contains quantifiable information relating to monitor 102. In this particular instance, hypothetical values AA, BB, and CC are listed for the monitor's RGB color values 606. Similarly, information YY describes manufacturer, model number and/or serial number related to camera 106 and information ZZ conveys such information for printer 110. Correspondingly red, green, blue (RGB) color values 608, 610 are listed as DD, EE, and FF for camera 106 and as GG, HH, and II for printer 110. This is of course but one example of color state information which can be associated with an image. Other implementations may convey more or less color state information and/or present the color state information in alternative configurations.

In the discussion above relating to FIGS. 1-6, color calibrating and color state information is handled by an operating system of a computing device. In other implementations this functionality could be achieved by an application program which could run on the computing device. In still other configurations, a set of color devices may be coupled as a system. One or more of the color devices may handle system wide color calibration. For instance, the color calibrating functionality may be coded into firmware of a color peripheral device. Similarly, in either a stand alone or system scenario, a color peripheral device may associate a color state with an image as described above in relation to FIGS. 5-6.

Exemplary System Environment

Figure 7:
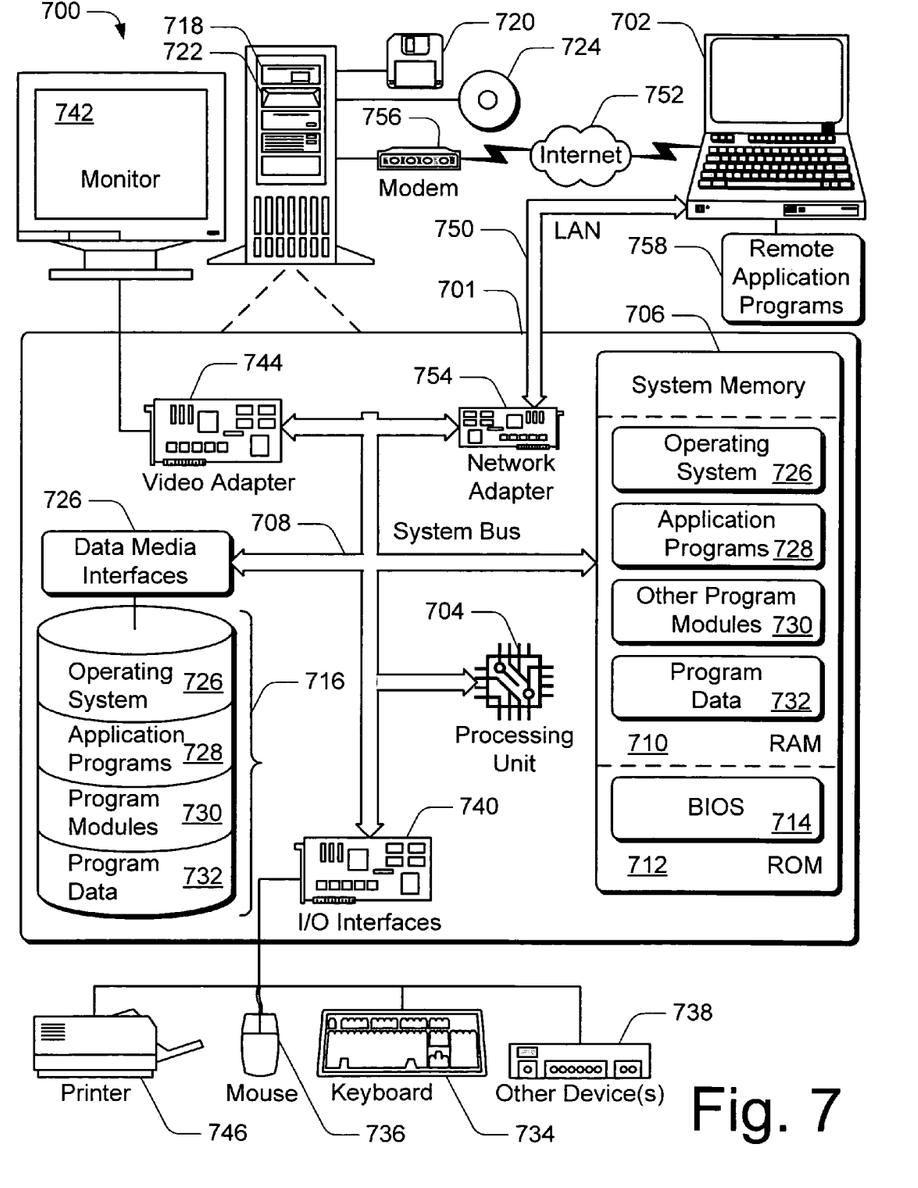
FIG. 7 illustrates exemplary systems, devices, and components in an environment for employing quantifiable color calibration.

FIG. 7 represents an exemplary system or computing environment 700 upon which quantifiable color calibration may be implemented. System 700 includes a general-purpose computing system in the form of a first machine 701 and a second machine 702.

The components of first machine 701 can include, but are not limited to, one or more processors 704 (e.g., any of microprocessors, controllers, and the like), a system memory 706, and a system bus 708 that couples the various system components. The one or more processors 704 process various computer executable instructions to control the operation of first machine 701 and to communicate with other electronic and computing devices. The system bus 708 represents any number of several types of bus structures, including a memory bus or memory controller, a peripheral bus, an accelerated graphics port, and a processor or local bus using any of a variety of bus architectures.

System 700 includes a variety of computer readable media which can be any media that is accessible by first machine 701 and includes both volatile and non-volatile media, removable and non-removable media. The system memory 706 includes computer-readable media in the form of volatile memory, such as random access memory (RAM) 710, and/or non-volatile memory, such as read only memory (ROM) 712. A basic input/output system (BIOS) 714 maintains the basic routines that facilitate information transfer between components within first machine 701, such as during start-up, and is stored in ROM 712. RAM 710 typically contains data and/or program modules that are immediately accessible to and/or presently operated on by one or more of the processors 704.

First machine 701 may include other removable/non-removable, volatile/non-volatile computer storage media. By way of example, a hard disk drive 716 reads from and writes to a non-removable, non-volatile magnetic media (not shown), a magnetic disk drive 718 reads from and writes to a removable, non-volatile magnetic disk 720 (e.g., a "floppy disk"), and an optical disk drive 722 reads from and/or writes to a removable, non-volatile optical disk 724 such as a CD-ROM, digital versatile disk (DVD), or any other type of optical media. In this example, the hard disk drive 716, magnetic disk drive 718, and optical disk drive 722 are each connected to the system bus 708 by one or more data media interfaces 726. The disk drives and associated computer readable media provide non-volatile storage of computer readable instructions, data structures, program modules, and other data for first machine 701.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, application programs 728, other program modules 730, and program data 732 (or some combination thereof) may include an embodiment of the systems and methods described herein.

A user can interface with first machine 701 via any number of different input devices such as a keyboard 734 and pointing device 736 (e.g., a "mouse"). Other input devices 738 (not shown specifically) may include a microphone, joystick, game pad, controller, satellite dish, serial port, scanner, and/or the like. These and other input devices are connected to the processors 704 via input/output interfaces 740 that are coupled to the system bus 708, but may be connected by other interface and bus structures, such as a parallel port, game port, and/or a universal serial bus (USB).

A monitor 742 or other type of display device can be connected to the system bus 708 via an interface, such as a video adapter 744. In addition to the monitor 742, other output peripheral devices can include components such as speakers (not shown) and a printer 746 which can be connected to first machine 701 via the input/output interfaces 740.

First machine 701 can operate in a networked environment using logical connections to one or more remote computers, such as second machine 702. By way of example, the second machine 702 can be a personal computer, portable computer, a server, a router, a network computer, a peer device or other common network node, and the like. The second machine 702 is illustrated as a portable computer that can include many or all of the elements and features described herein relative to first machine 701.

Logical connections between first machine 701 and the second machine 702 are depicted as a local area network (LAN) 750 and a general wide area network (WAN) 752. Such networking environments are commonplace in offices, enterprise-wide computer networks, intranets, and the Internet. When implemented in a LAN networking environment, the first machine 701 is connected to a local network 750 via a network interface or adapter 754. When implemented in a WAN networking environment, the first machine 701 typically includes a modem 756 or other means for establishing communications over the wide area network 752. The modem 756, which can be internal or external to first machine 701, can be connected to the system bus 708 via the input/output interfaces 740 or other appropriate mechanisms. The illustrated network connections are exemplary and other means of establishing communication link(s) between the first and second machines 701, 702 can be utilized.

In a networked environment, such as that illustrated with System 700, program modules depicted relative to the first machine 701, or portions thereof, may be stored in a remote memory storage device. By way of example, remote application programs 758 are maintained with a memory device of second machine 702. For purposes of illustration, application programs and other executable program components, such as the operating system 726, are illustrated herein as discrete blocks, although it is recognized that such programs and components reside at various times in different storage components of the first machine 701, and are executed by the processors 704 of the first machine.

Exemplary Processes

Figure 8:
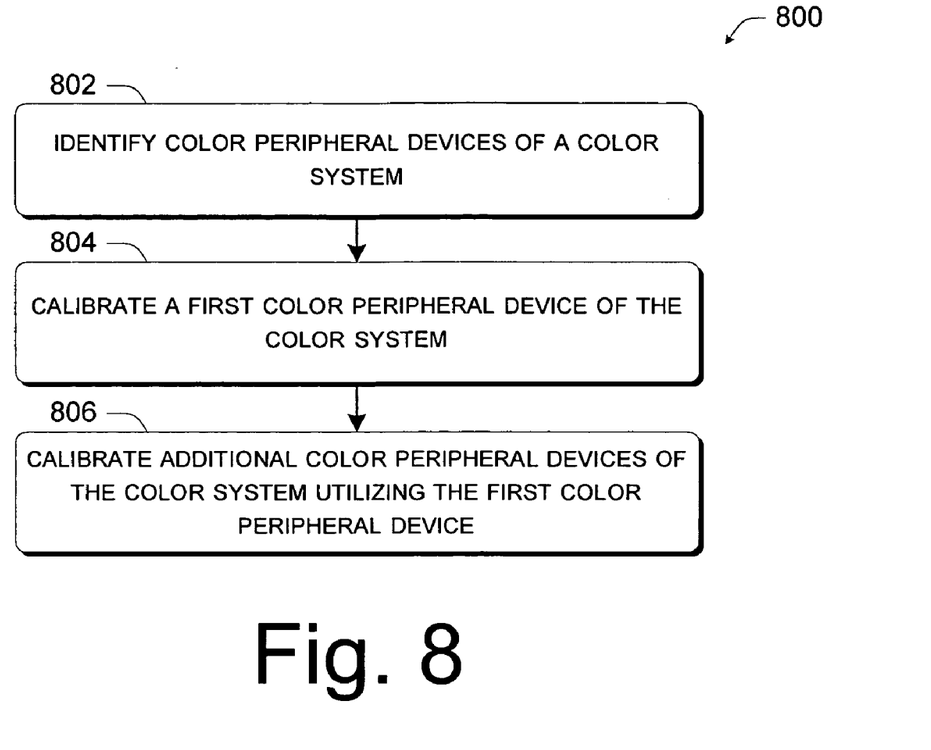
FIG. 8 illustrates an exemplary process diagram relating to quantifiable color calibration in accordance with one implementation.

FIG. 8 illustrates an exemplary process 800 for quantifiable color calibration in accordance with one implementation. The order in which the process is described is not intended to be construed as a limitation, and any number of the described process blocks can be combined in any order to implement the process. Furthermore, the process can be implemented in any suitable hardware, software, firmware, or combination thereof.

At block 802 the process identifies color peripheral devices of a color system. Various examples of color peripheral devices are described above and include for example, digital cameras, digital video cameras, camera cell phones, printers, monitors, and MFPs, among others. In some implementations, the identifying includes identifying a color profile for each identified color peripheral device. The color profile conveys what colors the color peripheral device is capable of generating.

At block 804 the process calibrates a first color peripheral device of the color system. Various known techniques can be utilized to calibrate the first color peripheral device. In some implementations, the first color peripheral device is calculated to a known color standard such as sRGB. Some of these implementations allow further calibration within tolerances allowed by the standard to satisfy user color preferences. For instance, a given standard may allow a tolerance of +/−3% for a given color, such as red. At least some of these techniques, such as through displaying various target images and querying the user, allow the user to establish preferences within the standard's tolerances. The process then calibrates the color peripheral device according to the user preferences. For instance, in the above example the user may prefer an appearance of the target image corresponding to a −1% red value.

At block 806 the process calibrates additional color peripheral devices of the color system utilizing the first color peripheral device. For example, the process can leverage the calibrated first color peripheral device in calibrating additional color peripheral devices. Such a process can, for example, serve to calibrate the additional devices consistent with the first calibrated color peripheral device. Stated another way, the additional color peripheral devices can be calibrated in the context of the first calibrated color peripheral device. Calibrating can be thought of as determining calibration error and then making calibration adjustments to compensate for the calibration error. In some instances, the calibration adjustments can be made through adjustment mechanisms on the color peripheral device. In other instances, software calibration adjustment of the image data sent to the color peripheral device may be utilized. In still other instances a combination of hardware and software adjustment may be employed to calibrate the color peripheral device.

In but one example of leveraging the first calibrated color peripheral device, output of a color peripheral device under test can be sent for reproduction on the calibrated first color peripheral device. The first color peripheral device should not introduce any additional calibration error since it is already calibrated. In some instances additional devices are calibrated as part of a test system. In some scenarios the test system includes two color peripheral devices. In one such example the color peripheral devices are treated as either capture devices which can capture an image or destination devices which can display an image either in electronic form or physical form. In one such scenario, the test system includes one capture device and one destination device. A target image can be captured by the capture device with the resulting output of the capture device utilized as input for the destination device. The resultant output of the destination device can then be compared to the original target image displayed on the first calibrated color peripheral device to calibrate the test system. In some instances, the output of the destination device is used as input into the capture device in an iterative process. The iterative process can be repeated for two or more cycles while maintaining the test system and test devices at a constant calibration state. The resultant output of the iterative process can be evaluated as described above and may accentuate calibration error. So for instance, the iterative output may be displayed on the first calibrated color peripheral device. The user can be queried regarding the displayed iterative output. The user may more accurately answer the queries than would be the case without the iterative process since the iterative process accentuates calibration error.

Once the test system is calibrated, one color peripheral device of the test system can be calibrated. The calibration of the remaining color peripheral device can be determined as a difference between the system calibration and the calibration of the other color peripheral device. Additional color peripheral devices can be substituted into the test system until all system color peripheral devices are calibrated.

Figure 9:
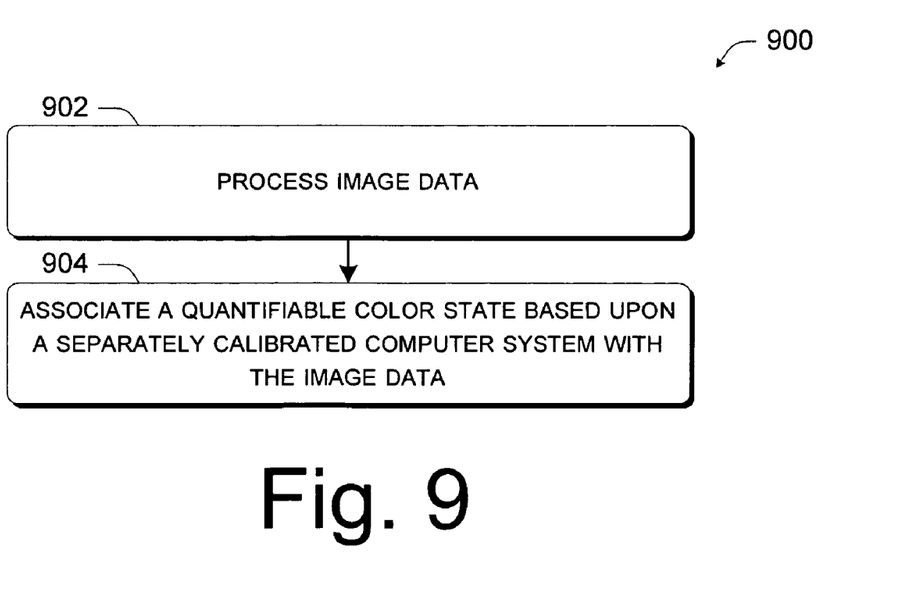
FIG. 9 illustrates an exemplary process diagram relating to associating color state with an image in accordance with one implementation.

FIG. 9 illustrates an exemplary process 900 for providing a color context for color image data in accordance with one implementation. The order in which the process is described is not intended to be construed as a limitation, and any number of the described process blocks can be combined in any order to implement the process. Furthermore, the process can be implemented in any suitable hardware, software, firmware, or combination thereof.

At block 902 the process processes image data. The processing can for instance, involve generating an image on a system color peripheral device. The processing may include manipulation of the image data such as regarding brightness, chroma, and/or hue, cropping the image, rotating the image etc.

At block 904 the process associates a quantifiable color state based upon a separately calibrated computer system with the image data. For instance, the color state can represent color state conditions at the culmination of said processing. For example, the color state conditions can include a system configuration listing the system's color peripheral devices and the color states of the individual color peripheral devices. One such example is described above in relation to FIG. 6.

The color state can be associated with the image data in any suitable way. In one such example, a lookup table may be maintained which cross-references a unique ID of the image to the color state. In another example, the color state is coupled to the image data. One technique for coupling the color state to the image data is to attach the color state as metadata to the image data. An example of such a configuration is described above in relation to FIGS. 5-6. Such a configuration allows recreation of the color state if the image data is subsequently utilized outside of the system. For instance, if the image data is sent to another system, such as via a network, the color state of the original system can be recreated at least to some degree, utilizing the color state coupled to the image data. Recreating the color state associated with the image increases a likelihood that the image is represented consistent with expectations of the user with which the image originated.

Although implementations relating to quantifiable color calibration and calibration information have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A computer-implemented method, comprising:
   identifying color peripheral devices of a color system;
   calibrating a first color peripheral device of the color system;
   calibrating additional color peripheral devices of the color system utilizing the first color peripheral device;
   calculating a calibration error of a test system, wherein the calculating calibration error of the test system comprises accentuating calibration errors of the test system via:
      repeating an iterative process for at least two cycles in which the test system and the additional color peripheral devices under test are maintained at a steady color state such that no adjustments are made to the test system, in which the iterative process comprises:
         a second color peripheral device sending a first output to a third color peripheral device;
         the third color peripheral device generating a second output based at least on the first output; and
         the third color peripheral device sending the second output to the second color peripheral device;
   presenting a final output of the iterative process to a user of the color system;
   determining a system configuration that includes a first color calibration setting of the first color peripheral device, a second color calibration setting of the second color peripheral device, and a third color calibration setting of the third color peripheral device;
   creating metadata that includes the system configuration; and
   associating the metadata with an image, the metadata enabling a second color system comprised of one or more color peripheral devices to adjust at least one of the one or more color peripheral devices to approximate the color state of the color system via the second color system.

2. The computer-implemented method as recited in claim 1, wherein the acts of calibrating comprise calibrating with at least one color management device.

3. The computer-implemented method as recited in claim 1, wherein the acts of calibrating comprise visually calibrating by the user.

4. The computer-implemented method as recited in claim 1, wherein the calibrating a first color peripheral device comprises calibrating the first color peripheral device to a user-preferred color state within tolerances of a known calibration standard.

5. The computer-implemented method as recited in claim 1, wherein the calibrating additional color peripheral devices comprises comparing a representation of a target image generated on an individual additional color peripheral device to a representation of the target image generated on the first color peripheral device.

6. The computer-implemented method as recited in claim 1, wherein the calibrating additional color peripheral devices comprises calibrating a test system comprising two additional color peripheral devices under test.

7. The computer-implemented method as recited in claim 1 further comprising upon completion of calculating the calibration error for the test system and the two color peripheral devices under test, substituting a different identified color peripheral device for one of the two color peripheral devices under test.

8. A computing device comprising:
   a processor;
   a memory coupled to the processor, the memory comprising computer-program instructions executable by the processor for:
      identifying color peripheral devices of a color system;
      calibrating a first color peripheral device of the color system;
      calibrating additional color peripheral devices of the color system utilizing the first color peripheral device;
      calculating a calibration error of a test system, wherein the calculating calibration error of the test system comprises accentuating calibration errors of the test system via:
         repeating an iterative process for at least two cycles in which the test system and the additional color peripheral devices under test are maintained at a steady color state such that no adjustments are made to the test system, in which the iterative process comprises:
            a second color peripheral device sending a first output to a third color peripheral device;
            the third color peripheral device generating a second output based at least on the first output; and
            the third color peripheral device sending the second output to the second color peripheral device;
      presenting a final output of the iterative process to a user of the color system;
      determining a first color calibration setting of the first color peripheral device;
      determining a second color calibration setting of the second color peripheral device;
      determining a third color calibration setting of the third color peripheral device;
      storing a system configuration comprising the first color calibration setting, the second color calibration setting, and the third color calibration setting; and
      storing the system configuration in metadata associated with an image, the metadata enabling a second color system comprised of one or more color peripheral devices to adjust at least one of the one or more color peripheral devices to approximate the color state of the color system via the second color system.

9. The computing device of claim 8, wherein the acts of calibrating comprise calibrating with at least one color management device.

10. The computing device of claim 8, wherein the acts of calibrating comprise visually calibrating by the user.

11. The computing device of claim 8, wherein the calibrating a first color peripheral device comprises calibrating the first color peripheral device to a user-preferred color state within tolerances of a known calibration standard.

12. The computing device of claim 8, wherein the calibrating additional color peripheral devices comprises comparing a representation of a target image generated on an individual additional color peripheral device to a representation of the target image generated on the first color peripheral device.

13. The computing device of claim 8, wherein the calibrating additional color peripheral devices comprises calibrating a test system comprising two additional color peripheral devices under test.

14. The computer-implemented method of claim 1, wherein the first color calibration setting includes a color calibration adjustment comprising a first adjustment that is performed on the first color peripheral device and a second adjustment that is performed via software.

15. Computer-readable storage device including instructions executable by a processor to perform acts comprising:
identifying color peripheral devices of a color system;
calibrating a first color peripheral device of the color system;
calibrating additional color peripheral devices of the color system based on the first color peripheral device;
calculating a calibration error of a test system by accentuating a calibration error of the color system via:
repeating an iterative process until the additional color peripheral devices maintain a steady color state in which no adjustments are made to the test system, the iterative process comprising:
sending a first output to a third color peripheral device from a second color peripheral device;
generating a second output via the third color peripheral device based at least on the first output; and
sending the second output to the second color peripheral device from the third color peripheral device;
determining a system configuration that includes a first color calibration setting of the first color peripheral device, a second color calibration setting of the second color peripheral device, and a third color calibration setting of the third color peripheral device;
creating metadata that includes the system configuration; and
associating the metadata with an image, the metadata enabling a second color system comprised of one or more color peripheral devices to adjust at least one of the one or more color peripheral devices to approximate the color state of the color system via the second color system.

* * * * *